US012632396B2

(12) United States Patent
Gonion

(10) Patent No.: US 12,632,396 B2
(45) Date of Patent: May 19, 2026

(54) MITIGATING ROW HAMMER ATTACKS THROUGH MEMORY ADDRESS ENCRYPTION

(71) Applicant: Apple Inc., Cupertino, CA (US)

(72) Inventor: Jeff Gonion, Campbell, CA (US)

(73) Assignee: Apple Inc., Cupertino, CA (US)

( * ) Notice: Subject to any disclaimer, the term of this patent is extended or adjusted under 35 U.S.C. 154(b) by 309 days.

(21) Appl. No.: 18/453,108

(22) Filed: Aug. 21, 2023

(65) Prior Publication Data

US 2024/0070090 A1      Feb. 29, 2024

Related U.S. Application Data

(60) Provisional application No. 63/401,466, filed on Aug. 26, 2022.

(51) Int. Cl.
G06F 12/14 (2006.01)
(52) U.S. Cl.
CPC ...... G06F 12/1408 (2013.01); G06F 12/1441 (2013.01)
(58) Field of Classification Search
CPC ............. G06F 12/1408; G06F 12/1441; G06F 2212/402
See application file for complete search history.

(56) References Cited

U.S. PATENT DOCUMENTS

| | | | | |
|---|---|---|---|---|
| 5,937,063 A * | 8/1999 | Davis | .................... | G06F 21/575 |
| | | | | 713/189 |
| 11,200,347 B1 * | 12/2021 | Dropps | .................... | G06F 21/44 |
| 11,256,427 B2 * | 2/2022 | Murphy | ................ | G06F 3/0655 |
| 11,556,646 B2 * | 1/2023 | Purushotham | ........ | G06F 21/556 |
| 11,651,810 B2 * | 5/2023 | Kim | ...................... | G06F 3/0655 |
| | | | | 711/154 |
| 2009/0113217 A1 * | 4/2009 | Dolgunov | ............. | G06F 21/556 |
| | | | | 713/190 |
| 2019/0043600 A1 | 2/2019 | Saileshwar et al. | | |
| 2022/0043757 A1 | 2/2022 | Durham et al. | | |
| 2022/0067157 A1 * | 3/2022 | Le Rolland | .............. | G11C 8/20 |
| 2022/0189527 A1 | 6/2022 | Kim | | |
| 2022/0209933 A1 | 6/2022 | Chhabra et al. | | |
| 2024/0004801 A1 * | 1/2024 | Jayasena | ............. | G06F 12/1408 |

OTHER PUBLICATIONS

Dae-Hyun Kim et al., Architectural Support for Mitigating Row Hammering in DRAM Memories, IEEE (Year: 2014).*
International Search Report and Written Opinion in PCT Appl. No. PCT/US2023/030966 mailed Dec. 12, 2023, 12 pages.
Office Action in Taiwanese Appl. No. 112132118 mailed Jun. 17, 2024, 6 pages.
N/A, "Preventing Row Hammer Attacks by Dynamic Indirection of Row Addresses", Technical Disclosure Commons, (Jun. 24, 2020) https://www.tdcommons.org/dpubs_series/3361; 10 pages.

* cited by examiner

*Primary Examiner* — Shanto Abedin
(74) *Attorney, Agent, or Firm* — Kowert, Hood, Munyon, Rankin & Goetzel, P.C.; Scott W. Pape; Dean M. Munyon

(57) ABSTRACT

In an embodiment, a system employs encryption on memory addresses generated by a source circuit that generates memory transactions (e.g., a processor such as a central processing unit (CPU), a graphics processing unit (GPU), various embedded processors or microcontrollers; or a peripheral device. The encrypted memory address corresponds to the row that is activated for the memory transaction, instead of the memory address generated by the source circuit.

20 Claims, 11 Drawing Sheets

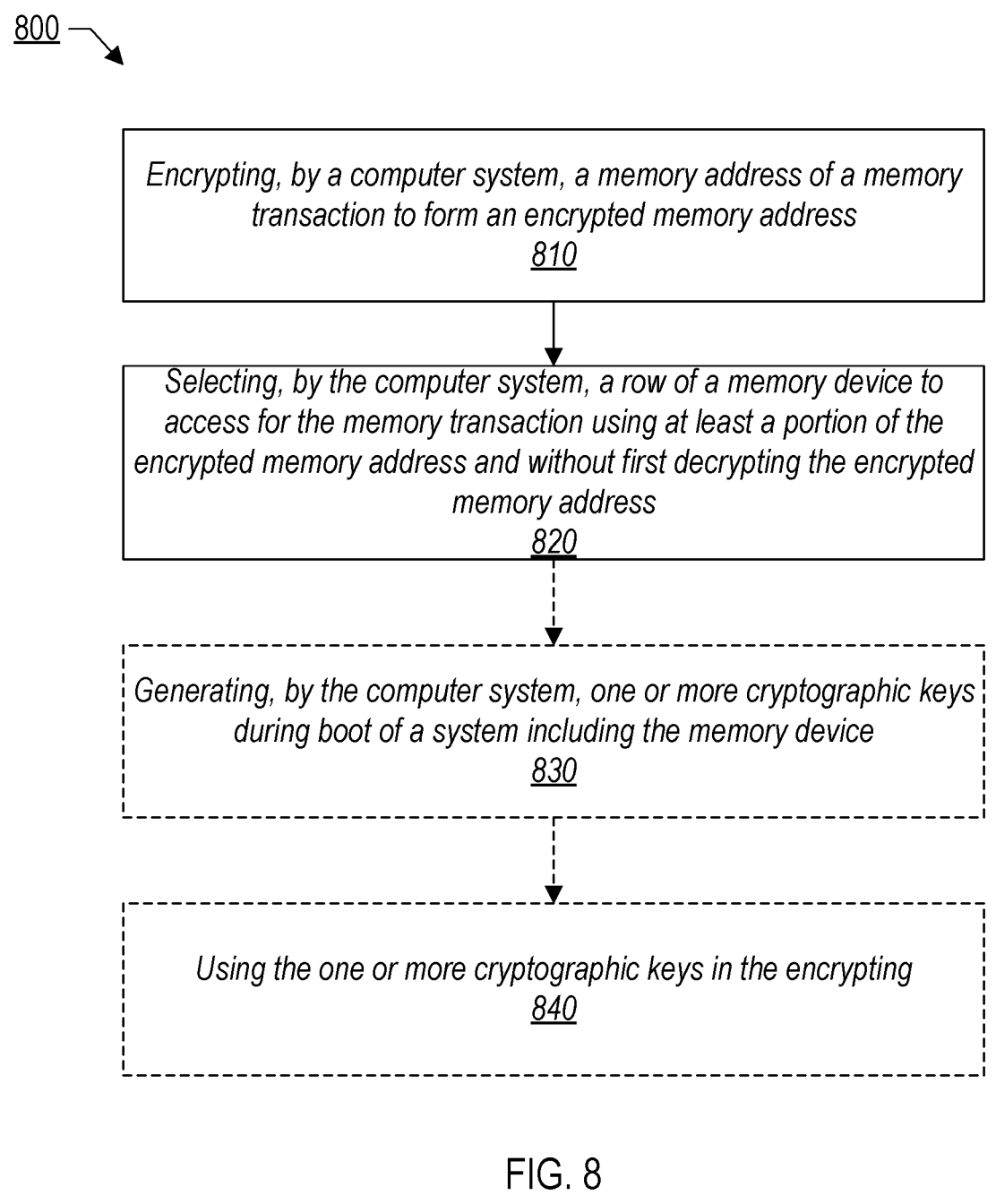

800 ⌐

Encrypting, by a computer system, a memory address of a memory transaction to form an encrypted memory address
810

Selecting, by the computer system, a row of a memory device to access for the memory transaction using at least a portion of the encrypted memory address and without first decrypting the encrypted memory address
820

Generating, by the computer system, one or more cryptographic keys during boot of a system including the memory device
830

Using the one or more cryptographic keys in the encrypting
840

FIG. 8

MITIGATING ROW HAMMER ATTACKS THROUGH MEMORY ADDRESS ENCRYPTION

PRIORITY CLAIM

The present application claims priority to U.S. Provisional Application No. 63/401,466, entitled "Address Encryption to Mitigate Memory Attack," filed Aug. 26, 2022, the disclosure of which is incorporated by reference herein in its entirety.

BACKGROUND

Technical Field

Embodiments described herein are related to preventing attacks on memory devices in a system.

Description of the Related Art

Dynamic random access devices (DRAM) in computing systems include a plurality of banks of memory cells arranged in rows and columns. Each memory cell includes a capacitor holding charge that represents the data in the cell (e.g., a binary one or a binary zero). Due to the nature of DRAM, reading or writing a particular column requires the entire row to be activated, whereupon the reading/writing of some number of columns is performed on the activated row. DRAMs are capacitive devices, which hold a charge and must be periodically refreshed to compensate for the charge draining over time. Electromagnetic fields caused by row activation (and the data contained in the row) can disrupt the capacitive memory cells in nearby rows, leading to data corruption in those rows. The memory devices are designed to survive such fields for some number of activations and periodic refreshes mitigate the effects of the fields along with charge leakage and other effects. That said, repeatedly activating the same row or rows over a short period of time can cause error. The process of repeatedly activating rows in an attempt to cause corruption in a row is known as "row hammering" (also known as "rowhammering" or "Row-Hammering").

Row hammering is noisy and somewhat non-deterministic, but is nevertheless reliable enough to allow attackers to mount attacks by hammering rows to change data in other rows of the DRAM, effectively writing DRAM but bypassing memory permissions which provide security in a computer system. It is also possible to hammer one row, and by observing how data changes in a second neighboring row, infer the contents of a third neighboring row.

Current techniques for mitigating row hammer attacks include refreshing DRAM more frequently, or attempting to detect attacks and refreshing only the rows being attacked more frequently. But detecting attacks reliably is extremely difficult and prone to surreptitious avoidance by attackers.

For a given type of computer system (e.g., a particular desktop computer model), there is typically a fixed algorithm for mapping memory addresses into DRAM channels, banks, and rows. This algorithm is known as an address hash. For simplicity, the address hash is usually linear and trivial to reverse-engineer. Furthermore, the address hash is typically "baked into" the hardware, and thus common to all systems of a particular design. The address hash is usable to determine which memory addresses correspond to adjacent rows of DRAM—knowledge of the relationship between DRAM rows is thus necessary in order to mount a successful row hammer attack. The process undertaken by an attacker to determine the address hash in the first instance commonly results in widespread DRAM corruption in the system being attacked, which typically takes the system down multiple times. But once the formula which determines the relationship between DRAM rows has been reverse-engineered for that single system, it is known for all instances of a given system, and can be used without limit thereafter. This is known as a "break-once run-everywhere" attack.

BRIEF DESCRIPTION OF THE DRAWINGS

The following detailed description refers to the accompanying drawings, which are now briefly described.

FIG. 8 is a flow diagram of one embodiment of a method for preventing attacks on memory devices in a system.

Figure 1:
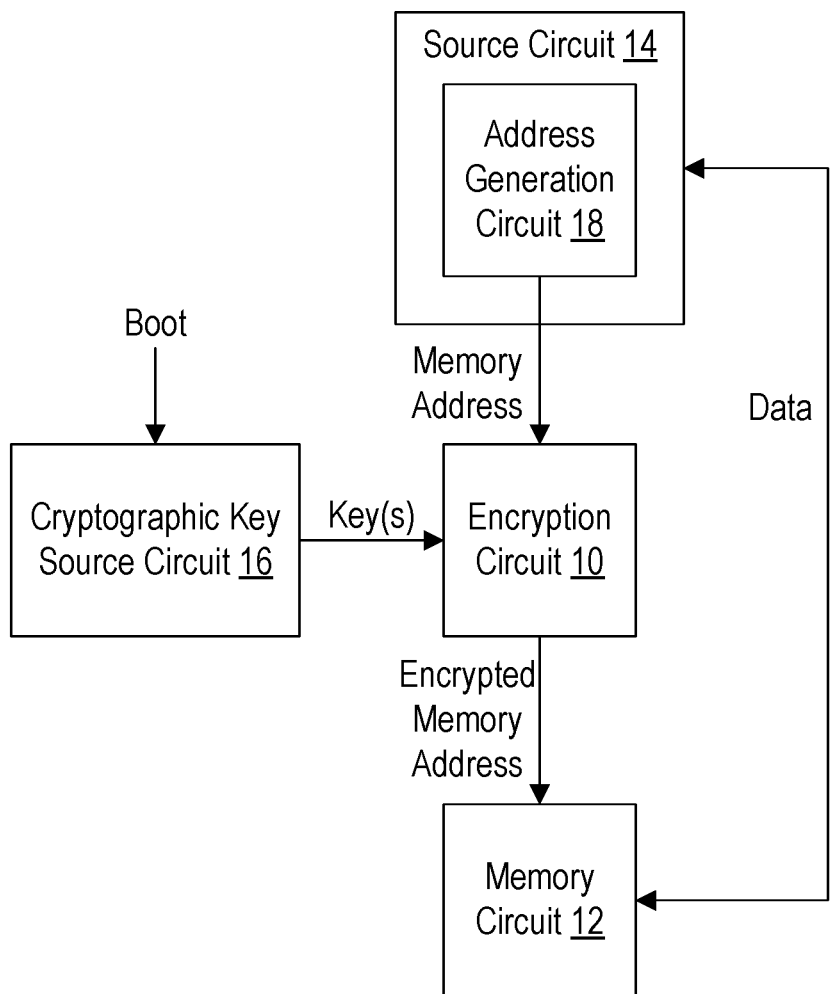
FIG. 1 is a block diagram of one embodiment of a system employing encryption on memory addresses.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description.

DETAILED DESCRIPTION OF EMBODIMENTS

As mentioned above, key information needed to successfully deploy a row hammer attack includes knowledge of the address hash algorithm. Without knowledge of which addresses will activate which rows in the DRAM, the attacker is unable to target a given row by activating adjacent rows repeatedly. The system disclosed herein deprives the attacker of knowledge of the relationship between addresses and DRAM rows, thus rendering row hammer attacks ineffective.

Particularly, the system employs encryption on the memory addresses generated by a source circuit that generates memory transactions (e.g., a processor such as a central processing unit (CPU), a graphics processing unit (GPU), various embedded processors or microcontrollers; or a peripheral device). The encryption is based on a cryptographic key that is not available to the attacker, and the encryption algorithm itself may not be made public as well in some embodiments. The encrypted memory address corresponds to the row that is activated for the memory transaction, instead of the memory address generated by the source circuit (which could be under the control of the attacker). Accordingly, the system deprives the attacker of the knowledge of which addresses to generate to hammer a row adjacent to a desired victim row. More sophisticated attacks which attempt to hammer multiple neighboring rows (to avoid the detection mentioned previously) would be even further thwarted since the attacker cannot determine which addresses activate rows that are adjacent to the victim row within some number of rows. Where each instance of a system utilizes different encryption keys, this means that the relationship between DRAM rows and addresses is different for each instance of a system.

In an embodiment, the cryptography may be relatively lightweight (e.g., not requiring much compute hardware and/or not requiring many iterations through the compute hardware to perform the encryption). Example algorithms may include PRINCE, lightweight encryption algorithm (LEA), Quark, Marvin, PRESENT, SPONGENT, advanced encryption standard (AES), data encryption standard (DES), Blowfish, Rivest Cipher (RC4, RC5, RC6, etc.), SLIM, Rivest, Shamir, and Adleman (RSA), etc. The cryptographic operation may be performed relatively quickly, thus avoiding undue increase in latency of the memory transactions. In an embodiment, the encryption circuit that performs the encryption of the memory address may employ a translation lookaside buffer (TLB)-like structure to cache unencrypted memory addresses and the corresponding encrypted addresses. In an embodiment in which the encryption circuit is local to the source circuit of the memory transaction, if the source circuit employs virtual to physical address translation, the caching structures in the translation circuit (e.g., TLBs) may be used to map virtual addresses to the corresponding encrypted addresses.

Viewed in another way, the encryption of memory addresses to form the encrypted memory addresses used to access the memory may be a form of secure hash. The hash may not be available to the source circuit directly, but the hash is collision-free. Thus, the encryption circuits described herein may be examples of a secure hash circuit. A secure hash circuit may be any circuit that operates on a memory address and at least one other datum that is not predictable and secret, to produce an output memory address that may be used to access a memory. For example, a cryptographic key may be an unpredictable and secret datum. The secure has circuit may perform any logic operation on the datum and the memory address to produce the output address (e.g., encryption, exclusive OR, etc.). The cryptographic key source circuits describe herein may be examples of a secret datum source circuit configured to generate the secret datum (and to randomize the secret datum at initialization).

Since encryption is nonlinear, the relationship between DRAM rows and addresses must be determined through exhaustive search on the attacker's part. But if different encryption keys are used on each system, even if an attacker's search could be successfully completed on the attacker's own system, it would tell the attacker nothing about the relationship between DRAM rows and addresses on other systems, including the victim's system. That is, even if an attacker could determine that row A could be attacked on the attacker's system by hammering rows B and C and how rows A, B, and C could be accessed through encrypted memory addresses, under techniques described herein, this information about the attacker's system would be useless in terms of successfully attacking the victim's system.

As a further level of attack prevention, the cryptographic key used in the encryption on a given system may be randomized each time the system is initialized (e.g., "cold boot"). Accordingly, the relationship between the unencrypted memory addresses and DRAM rows may vary with each initialization. Even if the attacker were able to determine some information regarding which unencrypted addresses are mapped to adjacent rows, the information would be useless at the next initialization. Since the row hammering attacks often cause system crashes (and thus reboots) due to randomly changing data, the ability to determine any significant information may be strongly curtailed. Using this approach, the relationship between DRAM addresses and memory rows can be varied on each cold boot on each instance of a particular system.

Because data used to generate the cryptographic keys for memory address encryption are different for different instances of a system, and because they may be randomized at each initialization, break-once-run-anywhere attacks may be thwarted using the address encryption mechanisms described herein.

In order to execute a row hammer attack on a victim's system, an attacker faces two barriers. First, the address of the victim row that will facilitate the attack is different on every system; accordingly, the attacker must search for the address of the victim row. This is not always possible, since quite often the critical row is already in use by the piece of software that will be attacked. Second, once the victim row is located, the attacker must exhaustively search for all the neighboring rows needed to mount the attack. Since the search process requires row hammering, and row hammering corrupts memory, the search process is highly likely to cause the system to crash, which would require a reboot. During a reboot, however, a new set of cryptographic keys can be utilized to encrypt memory addresses, meaning that the search must begin from scratch.

In an embodiment, at least the portion of the memory address used as the memory row address is encrypted. In addition, in some embodiments, the portion of the memory address that is used for bank and/or channel addresses may also be encrypted, which makes the search process more comprehensive, but also has the positive side-effect of achieving a better dispersion of DRAM addresses among banks and channels. This dispersion may help avoid pathological performance problems due to resource conflicts that often occur with simple address hashing techniques. In some embodiments, two or more ranks of DRAMs may be coupled to a channel and the portion of the memory address used to identify the rank may be encrypted as well. In an embodiment, the entire memory address may be encrypted if desired.

In an embodiment, the data written to memory/read from may also be encrypted/decrypted. For row hammer attacks, the data bit to hammer in order to change the state of a victim bit is the opposite polarity of the victim bit (e.g., a binary one for a victim zero, or a binary zero for a victim one). Since encryption changes the data bits, the attacker cannot reliably know the state of the victim and aggressor bits in an attack.

In various embodiments, the encryption may occur before or after the address hash to generate the row address (and channel, bank, or rank addresses as well, if applicable).

Alternatively, the encryption may replace the address hash and the encrypted address may be the row address.

Figure 2:
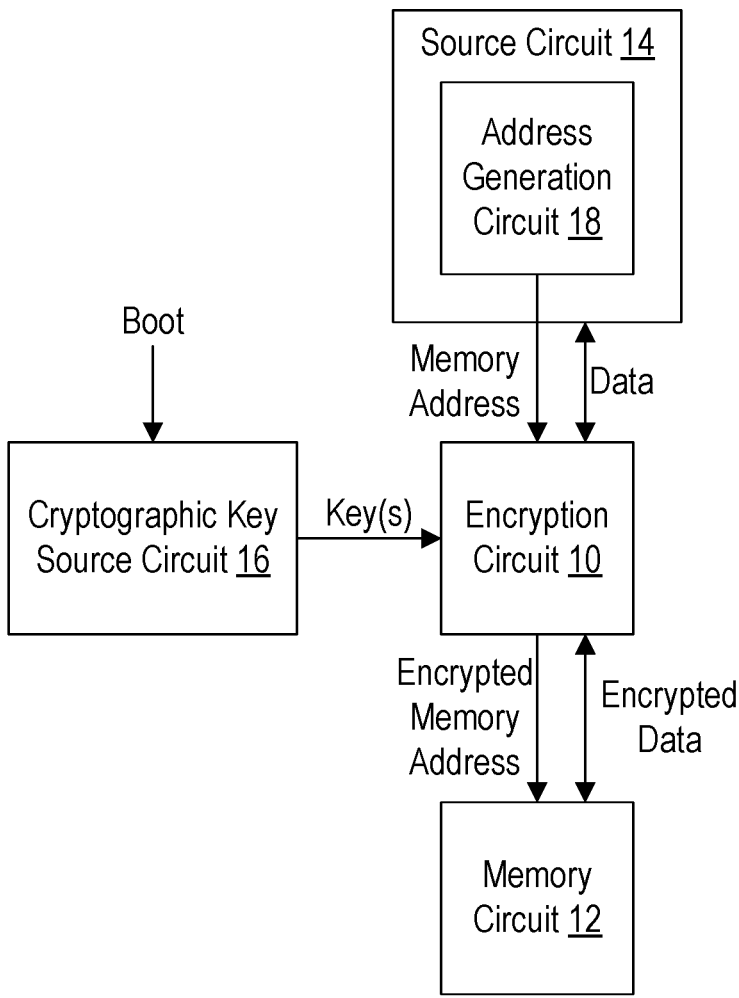
FIG. 2 is a block diagram of another embodiment of the system.

FIG. 1 is a block diagram of one embodiment of a system that may employ the address encryption disclosed herein. The system may comprise one or more source circuits 14, one or more encryption circuits 10, one or memory circuits 12, and a cryptographic key source circuit 16. In the illustrated embodiment, the cryptographic key source circuit 16 and the source circuit 14 are coupled to the encryption circuit 10, which is coupled to the memory circuit 12. The memory circuit 12 is further coupled to the source circuit 14 in the embodiment of FIG. 1. FIGS. 1 and 2 are intended to be high-level diagrams of the components, and thus "coupled" should be interpreted in the broad sense: There may be other components between the various component shown in FIGS. 1 and 2.

More particularly, the source circuit 14 may be configured to initiate memory transactions. A given memory transaction includes a memory address within a memory address space corresponding to a memory system that includes the memory circuit 12. For example, in FIG. 1, the address generation circuit 18 is illustrated as a component within the source circuit 14. The address generation circuit 18 may represent circuitry that generates the memory address. For example, the address generation circuit 18 in a processor such as a CPU or GPU may include the circuitry that adds various operands of an instruction to produce a virtual address, which may be translated through an address translation mechanism (e.g., a translation lookaside buffer (TLB) that caches virtual to physical address translations from a plurality of page tables in memory, along with table walk circuitry to walk the page tables when the TLB misses). Additionally, the address generation circuit 18 in a processor may include a fetch address generation circuit in some embodiments. The fetch address generation circuit may be configured to generate addresses from which to read instructions for execution in the processor. For a peripheral interface circuit, the address generation circuit 18 may be part of the circuitry that receives a read or write operation from the interface and relays the memory transaction to the memory circuit 12. For a peripheral component, the address generation circuit 18 may include a register that is written by driver software with a memory address for a memory transaction, or may be generated by hardware in the peripheral component.

The encryption circuit 10 is configured to receive the memory address of the memory transaction and one or more encryption circuits, and is configured to encrypt the memory address to form an encrypted memory address. As mentioned above, the encryption circuit 10 may encrypt the entire memory address, a portion of the memory address that is hashed or otherwise used to identify the row in the memory circuit 12 that is accessed, portions of the memory address that identify the row, bank, and/or channel, etc. If address hashing is used to identify the row (and/or bank and/or channel), the encryption may be performed prior to the hash, on the memory address portion that is input to the hash, or maybe performed on the result of the hash.

The encryption circuit 10 may be coupled to the cryptographic key source circuit 16 to receive one or more cryptographic keys for inclusion in the encryption process. The cryptographic key source circuit 16 may include data that is unique to a given instance of the system (e.g., one or more hidden keys in fuses or other non-volatile preservation in the circuit 16). The unique data may be operated upon to generate the cryptographic keys for the encryption circuit 10. The cryptographic key source circuit 16 may be configured generate the cryptographic keys at each initialization of the system (e.g., at "cold boot," represented by the boot input in FIG. 1). More particularly, the cryptographic key source circuit 16 may be configured to randomize the one or more cryptographic keys at each initialization, and thus the mapping of address to rows in the memory circuit 12 may be different at each initialization. The randomization may be based on dynamic data as well as the unique data to generate random keys.

The encrypted memory address may be provided to the memory circuit 12. The memory circuit 12 may be configured to access a row of the memory circuit for data corresponding to the memory transaction based on the encrypted memory address. For a write transaction, the source circuit 14 may be configured to transmit the data to be stored into the accessed row to the memory circuit 12. For a read transaction, the memory circuit 12 may provide data from the accessed row to the source circuit 14.

As mentioned previously, the memory circuit 12 may comprise a memory array of rows, where a given row is accessed based on a portion of the encrypted memory address (e.g., a hash of the portion, or the portion may be interpreted as a row number). Other address bits may identify an offset within the row, if the size of the memory transaction is smaller than the row size (e.g., the size indicates fewer bits than the row size). In an embodiment, the memory circuit 12 may include a plurality of banks, each of which include a plurality of rows. The bank may similarly be selected for a memory transaction via a portion of the encrypted memory address. The memory circuit 12 may be coupled to one of a plurality of channels in the system, and the channel may be identified by yet another portion of the encrypted memory address. In an embodiment, the memory circuit 12 may be one of a plurality of memory circuits coupled to a channel, where each memory circuit 12 is identified as a rank on the memory channel. A given rank of the plurality of ranks on the given channel may be selected based on still another portion of the encrypted memory address.

FIG. 2 is a block diagram of another embodiment of the system shown in FIG. 1. In the embodiment of FIG. 2, the data from/to the memory circuit 12 also passes through the encryption circuit 10. That is the, data for a write transaction may be transmitted by the source circuit 14 to the encryption circuit 10, which may be configured to encrypt the data being written to the given memory circuit for the write transaction. ("encrypted data") in FIG. 2. Similarly, for a read transaction, encrypted data may be provided by the memory circuit 12 to the encryption circuit 10, which may be configured to decrypt the read data and to provide the decrypted read data to the source circuit 14. The cryptographic key used to encrypt the data may be the same key used to the encrypt the memory address, or may be a different key proved by the cryptographic key source circuit 16.

Figure 4:
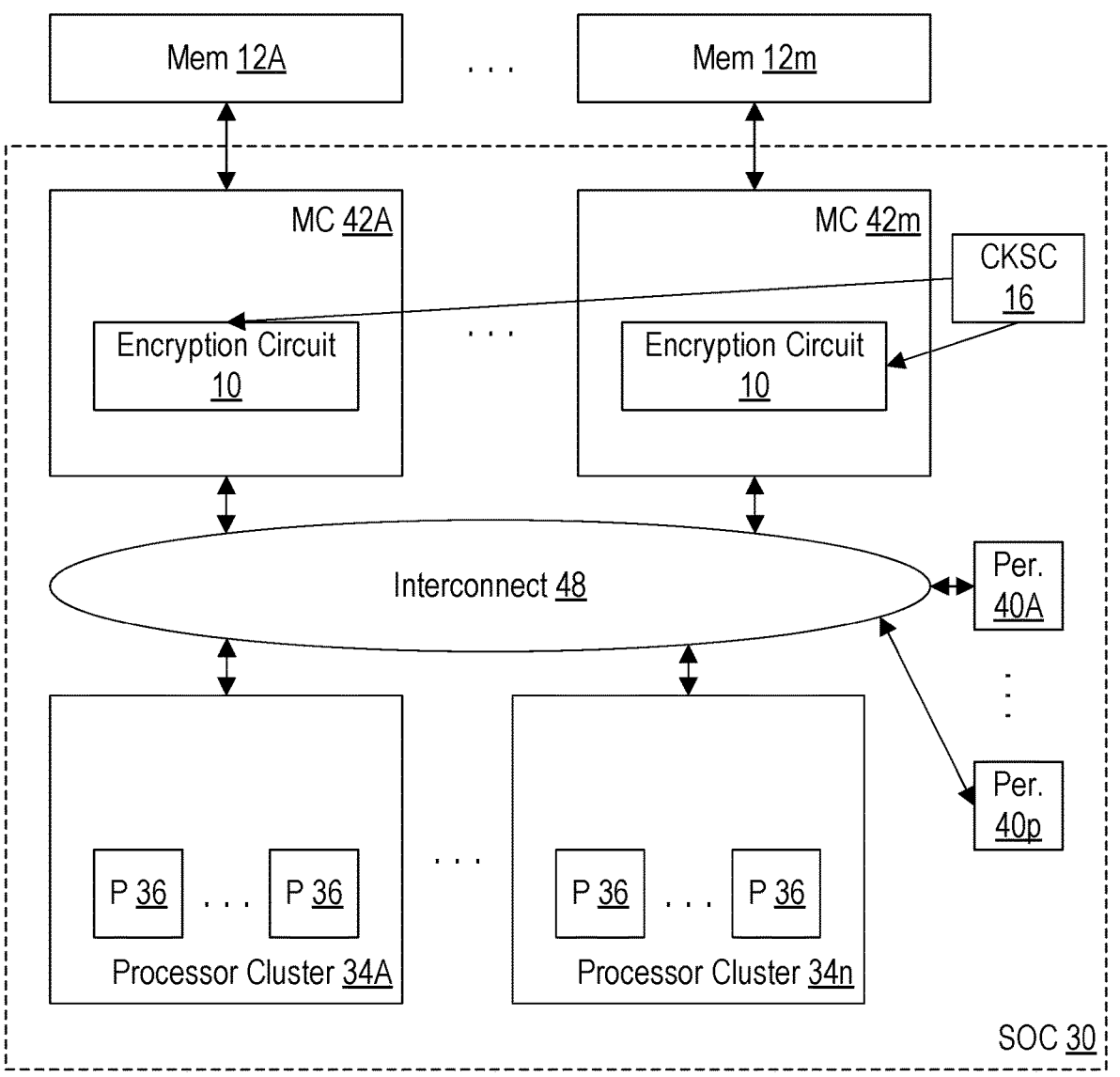
FIG. 4 is a block diagram of another embodiment of the systems shown in FIG. 1 or 2 in the form of an SOC.
Figure 5:
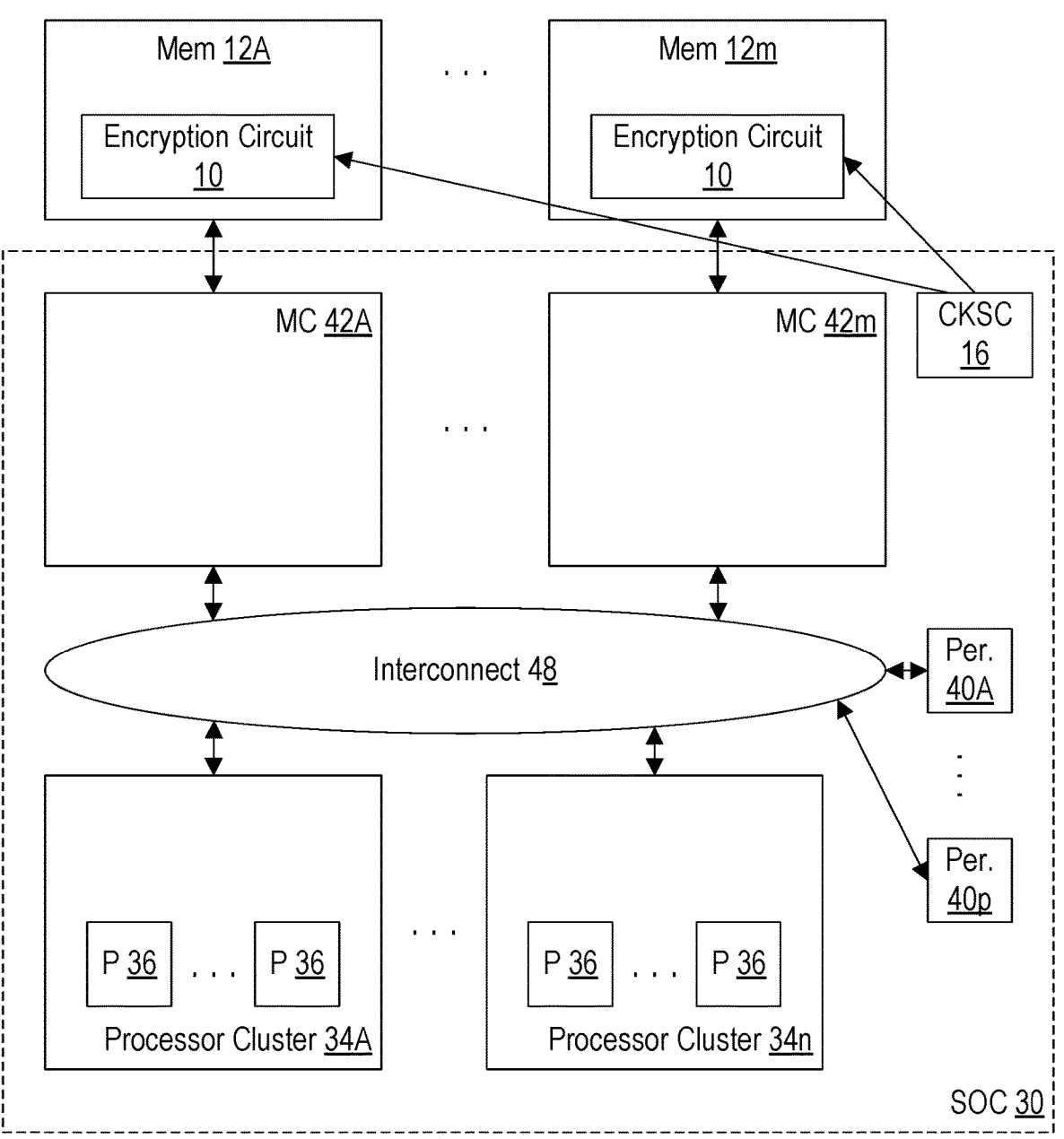
FIG. 5 is a block diagram of still another embodiment of the systems shown in FIG. 1 or 2 in the form of a system on a chip (SOC).

As discussed above, the embodiments of FIGS. 1 and 2 are high-level block diagrams illustrating the encryption of memory addresses and, in some embodiments, data. In general, the encryption circuit 10 may be implemented at any point between address generation for a memory transaction and the accessing of a row in the memory circuit 12. Examples of some embodiments of a system with the encryption circuit implemented at various locations are illustrated in FIGS. 3-5.

Figure 3:
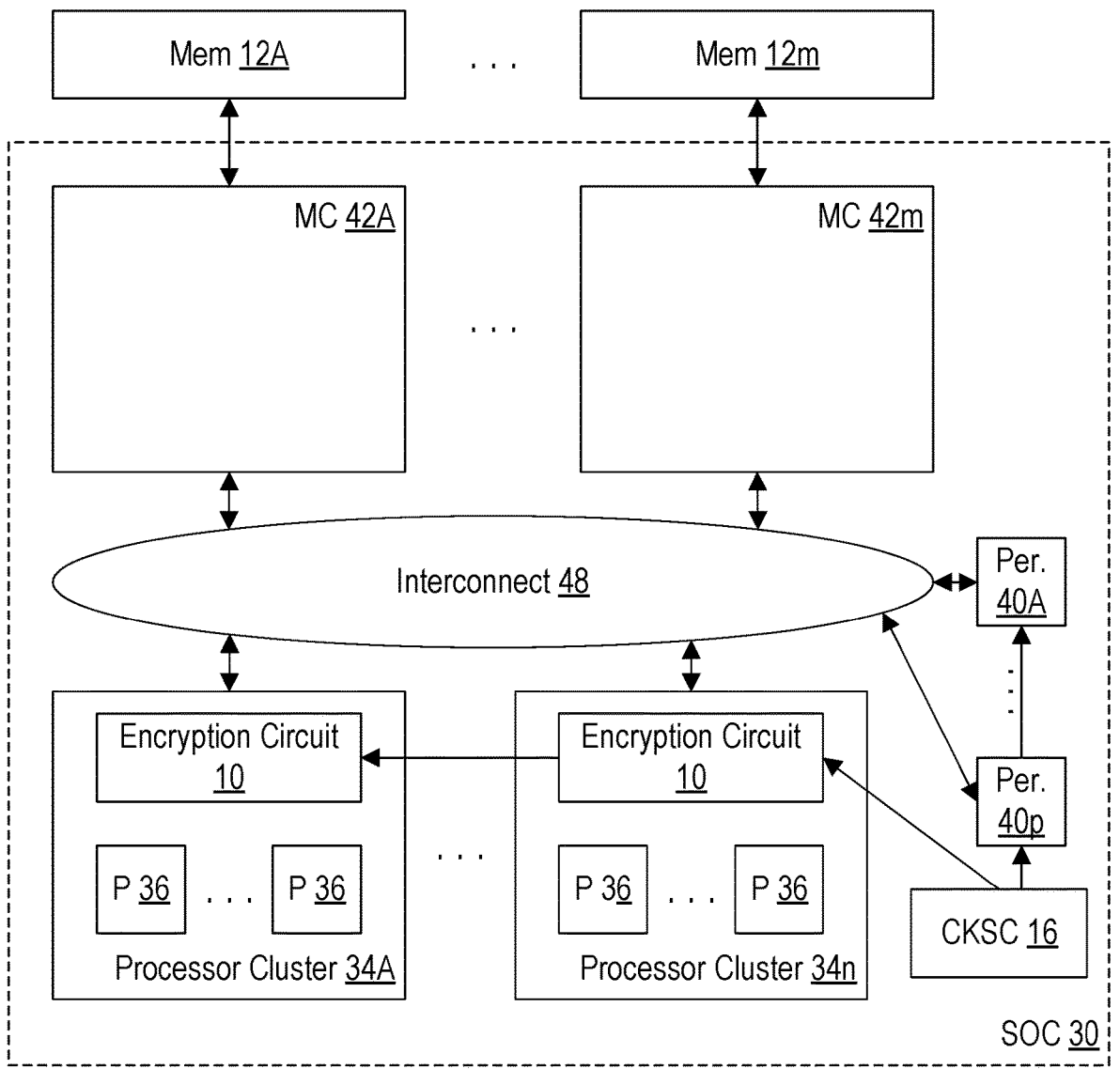
FIG. 3 is a block diagram of one embodiment of the systems shown in FIG. 1 or 2 in the form of a system on a chip (SOC).

FIG. 3 is a block diagram of embodiment of a system including a system on a chip (SOC) 30 coupled to one or more memories such as memory circuits 12A-12m. The memory circuits 12A-12*m* may be instances of the memory circuit 12 shown in FIGS. 1-2. The SOC 30 may include a plurality of processor clusters 34A-34*n*. The processor clusters 34A-34*n* may include one or processors (P) 36 as well as other components such as a local cache hierarchy ending in a last level cache (LLC) before transactions are sent on an interconnect 48. The SOC 30 may include one or more peripheral components (Per.) 40A-40*p*. The SOC 30 may include one or more memory controllers 42A-42*m*, each coupled to a respective memory circuit 12A-12*m* during use. The memory controllers 42A-42*m*, the peripheral components 40A-40*p*, and the processor clusters 34A-34*n* may be coupled to the interconnect 48 to communicate between the various components 42A-42*m*, 40A-40*p*, and 34A-34*n*. As indicated by the name, the components of the SOC 30 may be integrated onto a single integrated circuit/semiconductor substrate or "chip," in one embodiment. In other embodiments, various components may be external to the SOC 30 on other chips or otherwise discrete components. Any amount of integration or discrete components may be used. In one embodiment, subsets of processor clusters 34A-34*n*, memory controllers 42A-42*m*, and peripheral components 40A-40*p* may be implemented in one of multiple integrated circuit chips that are coupled together to form the components illustrated in the SOC 30 of FIG. 3.

The processor clusters 34A-34*n* and the peripheral components 40A-40*p* may be examples of source circuits in this embodiment. Additionally, in this embodiment, instances of the encryption circuit 10 may be located physically near a given source circuit. For example, in FIG. 3, the encryption circuit 10 may be incorporated into the given source circuit. The processor clusters 34A-34*n* are illustrated in FIG. 3 has having encryption circuits 10, and the peripherals 40A-40*p* may have encryption circuits as well (not shown in FIG. 3). Thus, the cryptographic key source circuit 16 (CKSC in FIG. 3) may be coupled to the processor clusters 34A-34*n* and the peripheral components 40A-40*p* (and more particularly, to the encryption circuits 10 in the clusters 34A-34*n* and the peripheral components 40A-40*p*).

The processors 36 may serve as the central processing units (CPUs) of the SOC 30. The CPU of the system includes the processor(s) that execute the main control software of the system, such as an operating system. Generally, software executed by the CPU during use may control the other components of the system to realize the desired functionality of the system. The processors may also execute other software, such as application programs. The application programs may provide user functionality, and may rely on the operating system for lower-level device control, scheduling, memory management, etc. Accordingly, the processors may also be referred to as application processors. The processor clusters 34A-34*n* may further include other hardware such as various caches and/or an interface to the other components of the system (e.g., an interface to the interconnect 48). Other processor clusters 34A-34*n* may include processors that are not CPUs (e.g., graphics processing units or GPUs).

Generally, a processor may include any circuitry and/or microcode configured to execute instructions defined in an instruction set architecture implemented by the processor. Processors may encompass processor cores implemented on an integrated circuit with other components as a system on a chip (SOC 30) or other levels of integration. Processors may further encompass discrete microprocessors, processor cores and/or microprocessors integrated into multichip module implementations, processors implemented as multiple integrated circuits, etc. The number of processors 36 in a given processor cluster 34A-34*n* may differ from the number of processors 36 in another processor cluster 34A-34*n*. In general, one or more processors may be included. Additionally, the processors 36 may differ in microarchitectural implementation, performance and power characteristics, etc. In some cases, processors may differ even in the instruction set architecture that they implement, their functionality (e.g., CPU, GPU, microcontrollers, digital signal processors, image signal processors, etc.), etc.

The memory controllers 42A-42*m* may generally include the circuitry for receiving memory transactions from the other components of the SOC 30 and for accessing the memory circuits 12A-12*m* to complete the memory transactions. The memory controllers 42A-42*m* may be configured to access any type of memory circuits 12A-12*m*. For example, the memories 12A-12*m* may be static random access memory (SRAM), dynamic RAM (DRAM) such as synchronous DRAM (SDRAM) including double data rate (DDR, DDR2, DDR3, DDR4, etc.) DRAM, non-volatile memories, graphics DRAM such as graphics DDR DRAM (GDDR), and high bandwidth memories (HBM). Low power/mobile versions of the DDR DRAM may be supported (e.g., LPDDR, mDDR, etc.). The memory controllers 42A-42*m* may include queues for memory operations, for ordering (and potentially reordering) the operations and presenting the operations to the memory circuits 12A-12*m*. The memory controllers 42A-42*m* may further include data buffers to store write data awaiting write to memory and read data awaiting return to the source of the memory operation. In some embodiments, the memory controllers 42A-42*m* may include a memory cache to store recently accessed memory data. In SOC implementations, for example, the memory cache may reduce power consumption in the SOC by avoiding reaccess of data from the memory circuits 12A-12*m* if the data is expected to be accessed again soon. In some cases, the memory cache may also be referred to as a system cache, as opposed to private caches such as the caches in the processors 36, which serve only certain components. Additionally, in some embodiments, a system cache need not be located within the memory controllers 42A-42*m*.

The peripheral component circuits 40A-40*p* may generally include various additional hardware functionality included in the SOC 30 (e.g., "peripheral components" or "peripherals"). For example, the peripherals may include video peripherals such as an image signal processor configured to process image capture data from a camera or other image sensor, GPUs, video encoder/decoders, scalers, rotators, blenders, etc. The peripherals may include audio peripherals such as microphones, speakers, interfaces to microphones and speakers, audio processors, digital signal processors, mixers, etc. The peripherals may include interface controllers for various interfaces external to the SOC 30 including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included. The peripheral components 40A-40*p* may also include bridges to a set of peripherals, in an embodiment.

The interconnect 48 may be any communication interconnect and protocol for communicating among the components of the SOC 30. The interconnect 48 may be bus-based, including shared bus configurations, cross bar configurations, and hierarchical buses with bridges. The interconnect 48 may also be packet-based or circuit-switched, and may be hierarchical with bridges, cross bar, point-to-point, or other interconnects. The interconnect 48 may include multiple independent communication fabrics, in an embodiment.

Generally, the number of each component 42A-42*m*, 40A-40*p*, and 34A-34*n* may vary from embodiment to embodiment, and any number may be used. As indicated by the "m", "p", and "n" post-fixes, the number of one type of component may differ from the number of another type of component. However, the number of a given type may be the same as the number of another type as well. Additionally, while the system of FIG. 3 is illustrated with multiple memory controllers 42A-42*m*, embodiments having one memory controller 42A-42*m* are contemplated as well and may implement the cache coherency protocol described herein. Additionally, the memory controllers 42A-42*m* may support more than one memory circuit 12A-12*m* coupled to a given memory controller (e.g., via multiple channels from the memory controller to various memory circuits 12A-12*m* or via multiple memory circuits 12A-12*m* on a channel, such as dual rank configurations).

While the embodiment of FIG. 3 illustrates encryption circuits 10 physically located near the source circuits, or even within the source circuits, other embodiments may locate the encryption circuits 10 in other locations. For example, an embodiment in which the encryption circuits 10 are embedded in the interconnect 48 is contemplated. Furthermore, embodiments in which the encryption circuit(s) 10 is/are located physically near the memory circuit 12A-12*m* are contemplated.

FIG. 4 is a block diagram of such an embodiment. The embodiment of FIG. 4 may be similar to the embodiment of FIG. 3, and the discussion of FIG. 3 may generally apply to FIG. 4. However, in FIG. 4, the encryption circuits 10 may be incorporated in the memory controllers 42A-42*m* that control the respective memory circuits 12A-12*m*. Thus, the cryptographic key source circuit 16 may be coupled to the memory controllers 42A-42*m* and more particularly to the encryption circuits 10 in the memory controllers 42A-42*m*.

In other embodiments, the encryption circuits 10 may be incorporated into the memory circuits 12A-12*m* themselves. FIG. 5 is such an embodiment. The embodiment of FIG. 5 may be similar to the embodiment of FIG. 3, and the discussion of FIG. 3 may generally apply to FIG. 5. However, the encryption circuits 10 are in the memory circuits 12A-12*m* in FIG. 5. Accordingly, the cryptographic key source circuit 16 may be coupled to the memory circuits 12A-12*m* (e.g., over the channel between the memory controllers 42A-42*m* and the memory circuits 12A-12*m*, or via a sideband connection). In other embodiments, the cryptographic key source circuit 16 may be incorporated into each memory circuit 12A-12*m*.

Figure 6:
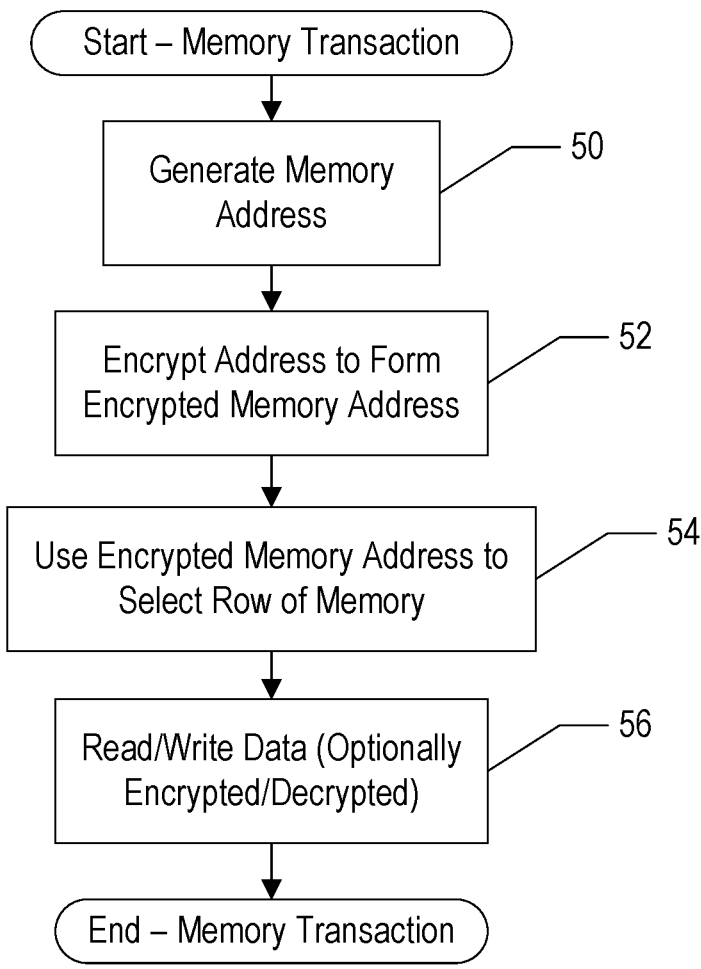
FIG. 6 is a flowchart illustrating operation of one embodiment of a memory transaction in the systems illustrated in FIGS. 1-5.

Turning now to FIG. 6, a flowchart is shown illustrating operation of one embodiment of the system to perform a memory transaction. While the blocks are shown in a particular order for ease of understanding, other orders may be used. Blocks may be performed in parallel by combinatorial logic circuitry in the system. Blocks, combinations of blocks, and/or the flowchart as a whole may be pipelined over multiple clock cycles.

The source circuit may be configured to generate the memory address (block 50). The encryption circuit may be configured to encrypt the memory address to form an encrypted memory address (block 52). At least a portion of the encrypted memory address may be used to select a row of the memory circuit (block 54). The memory circuit may read or write the data in the selected row (block 56). Optionally, in some embodiments, the written data may be encrypted by the encryption circuit and the read data may be decrypted by the encryption circuit (e.g., as shown in FIG. 2).

Figure 7:
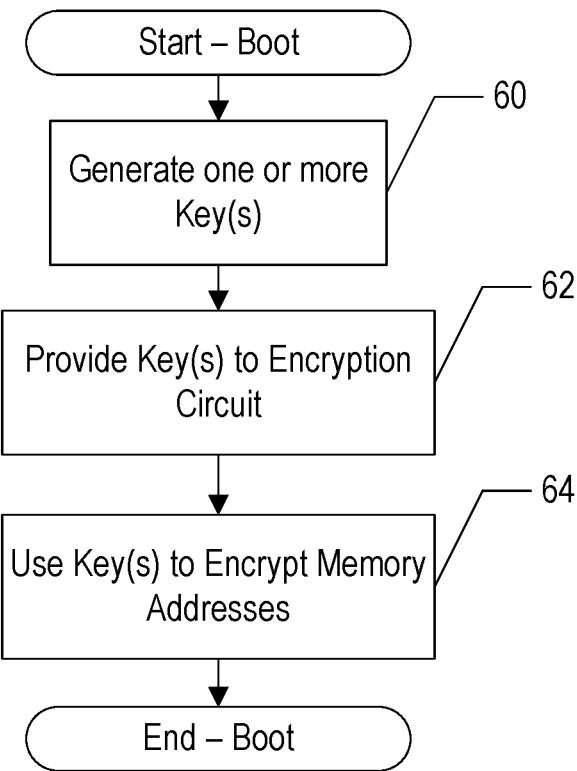
FIG. 7 is a flowchart illustrating certain operations that may occur during boot of the systems shown in FIGS. 1-5.

FIG. 7 is a flowchart illustrating operation of one embodiment of the system during initialization (e.g., cold boot). While the blocks are shown in a particular order for ease of understanding, other orders may be used. Blocks may be performed in parallel by combinatorial logic circuitry in the system. Blocks, combinations of blocks, and/or the flowchart as a whole may be pipelined over multiple clock cycles.

The cryptographic key source circuit may be configured to generate one or more cryptographic keys during boot of the system (e.g., cold boot) (block 60). The cryptographic key source circuit may provide the one or more keys to the encryption circuit (block 62), which may use the one or more cryptographic keys to perform the encryption (block 62).

Example Methods

FIG. 8 is a flow diagram of one embodiment of a method 800 for preventing attacks on memory devices in a system. Method 800 may be performed by circuits in a variety of places, including within memory 12 or locations within SOC 30. Method 800 can be used to prevent attacks on memory devices (e.g., memory circuit 12) by encrypting the memory addresses.

Method 800 commences in step 810, in which a computer system encrypts (e.g., using encryption circuit 10) a memory address of a memory transaction (e.g., initiated by a source circuit 14) to form an encrypted memory address. In some embodiments, the encryption circuit (e.g., encryption circuit 10) is incorporated into the source circuit. In other embodiments, the encryption circuit is incorporated into a memory circuit (e.g., memory circuit 12).

Method 800 continues in step 820, in which the computer system selects (e.g., using memory circuit 12) a row of a memory device to access for the memory transaction using at least a portion of the encrypted memory address, where the selecting is performed without first decrypting the encrypted memory address.

In some embodiments, the memory circuit comprises a plurality of banks, and the plurality of rows are included in a given bank of the plurality of banks that is selected based on at least another portion of the encrypted memory address. The given memory circuit may be coupled to a given channel of a plurality of channels, and the given channel may be selected based on yet another portion of the encrypted memory address. The given memory circuit may be a given rank of a plurality of ranks on the given channel, and the given rank may be selected based on still another portion of the encrypted memory address.

In some embodiments, method 800 may further include the use of cryptographic keys. In some embodiments, method 800 continues in step 830, in which the computer system generates one or more cryptographic keys during boot of a system (e.g., SoC 30) including the memory device. Then, method 800 may proceed to step 840, in which the computer system may use (e.g., via encryption circuit 10) the one or more cryptographic keys in the encrypting.

In some embodiments, the one or more cryptographic keys are generated by a cryptographic key source circuit (e.g., CKSC 16) configured to provide one or more cryptographic keys to the one or more encryption circuits for inclusion in the encryption of the memory address. In some embodiments, the cryptographic key source circuit is further configured to randomize the one or more cryptographic keys during the boot of the system.

Method 800 may further include the encryption and decryption of data in addition to memory addresses. In some embodiments, an encryption circuit (e.g., encryption circuit 10) may encrypt, based on the memory transaction being a write transaction, data being written to the memory device. Conversely, the encryption circuit may decrypt, based on the given memory transaction being a read transaction, data being read from the given memory circuit. Such encryption may be desirable because the optimal data to use in row hammering in order to flip bits is the opposite polarity of the victim data. Accordingly, hiding this from the attacker makes the attack significantly more difficult.

Example Device

Figure 9:
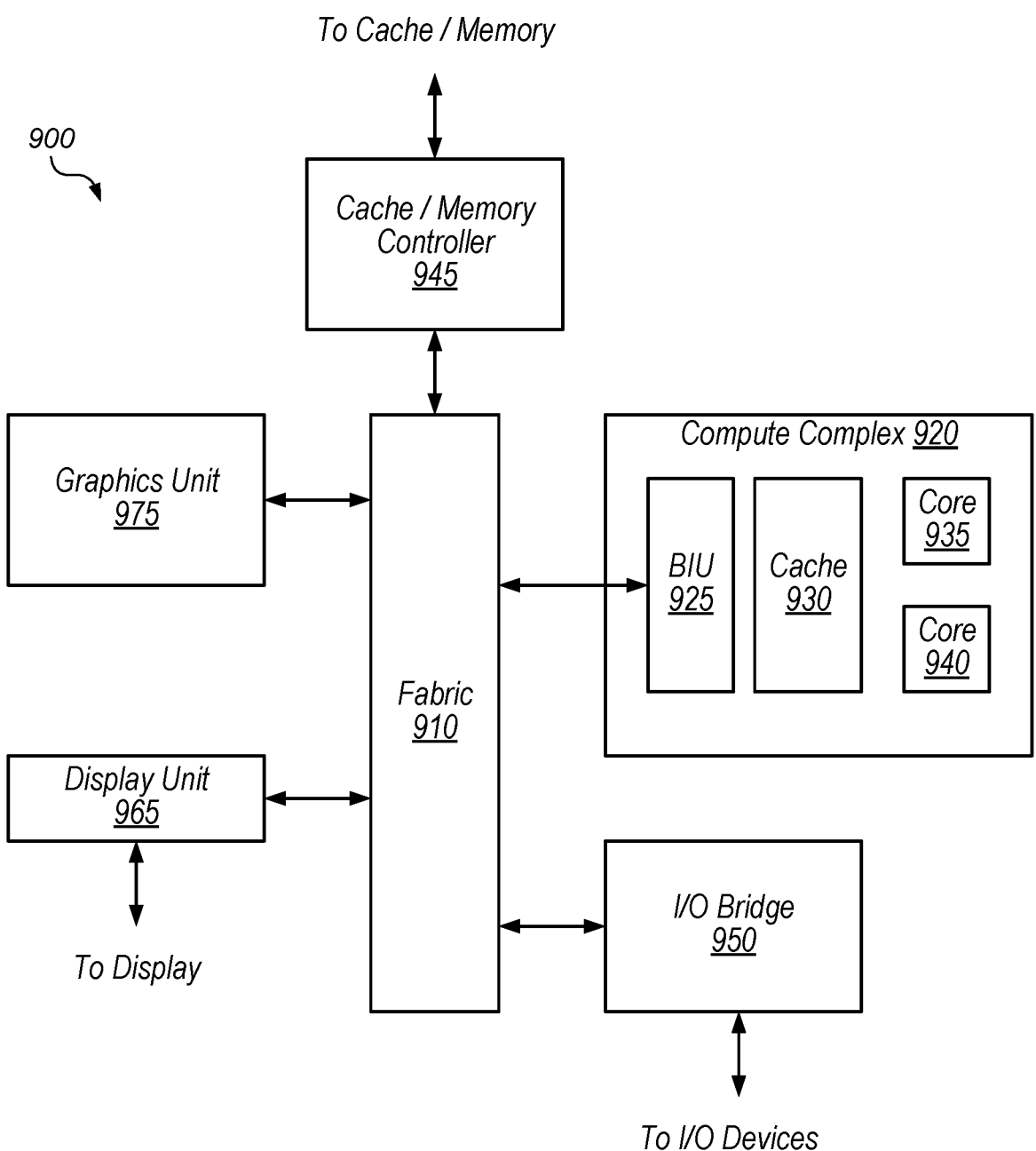
FIG. 9 is a block diagram illustrating an example computing device, according to some embodiments.

Referring now to FIG. 9, a block diagram illustrating an example embodiment of a device 900 is shown. In some embodiments, device 900 may implement functionality of SOC 30, or any of the circuits depicted in FIGS. 1-5. In some embodiments, elements of device 900 may be included within a system on a chip (e.g., SOC 30). In some embodiments, device 900 may be included in a mobile device, which may be battery-powered. Therefore, power consumption by device 900 may be an important design consideration. In the illustrated embodiment, device 900 includes fabric 910, compute complex 920 input/output (I/O) bridge 950, cache/memory controller 945, graphics unit 975, and display unit 965. In some embodiments, device 900 may include other components (not shown) in addition to or in place of the illustrated components, such as video processor encoders and decoders, image processing or recognition elements, computer vision elements, etc.

Fabric 910 may include various interconnects, buses, MUX's, controllers, etc., and may be configured to facilitate communication between various elements of device 900. In some embodiments, portions of fabric 910 may be configured to implement various different communication protocols. In other embodiments, fabric 910 may implement a single communication protocol and elements coupled to fabric 910 may convert from the single communication protocol to other communication protocols internally.

In the illustrated embodiment, compute complex 920 includes bus interface unit (BIU) 925, cache 930, and cores 935 and 940. In various embodiments, compute complex 920 may include various numbers of processors, processor cores and caches. For example, compute complex 920 may include 1, 2, or 4 processor cores, or any other suitable number. In one embodiment, cache 930 is a set associative L2 cache. In some embodiments, cores 935 and 940 may include internal instruction and data caches. In some embodiments, a coherency unit (not shown) in fabric 910, cache 930, or elsewhere in device 900 may be configured to maintain coherency between various caches of device 900. BIU 925 may be configured to manage communication between compute complex 920 and other elements of device 900. Processor cores such as cores 935 and 940 may be configured to execute instructions of a particular instruction set architecture (ISA) which may include operating system instructions and user application instructions. These instructions may be stored in computer readable medium such as a memory coupled to memory controller 945 discussed below.

As used herein, the term "coupled to" may indicate one or more connections between elements, and a coupling may include intervening elements. For example, in FIG. 9, graphics unit 975 may be described as "coupled to" a memory through fabric 910 and cache/memory controller 945. In contrast, in the illustrated embodiment of FIG. 9, graphics unit 975 is "directly coupled" to fabric 910 because there are no intervening elements.

Cache/memory controller 945 may be configured to manage transfer of data between fabric 910 and one or more caches and memories. For example, cache/memory controller 945 may be coupled to an L3 cache, which may in turn be coupled to a system memory. In other embodiments, cache/memory controller 945 may be directly coupled to a memory. In some embodiments, cache/memory controller 945 may include one or more internal caches. Memory coupled to controller 945 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 945 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 920 to cause the computing device to perform functionality described herein.

Graphics unit 975 may include one or more processors, e.g., one or more graphics processing units (GPUs). Graphics unit 975 may receive graphics-oriented instructions, such as OPENGL®, Metal®, or DIRECT3D® instructions, for example. Graphics unit 975 may execute specialized GPU instructions or perform other operations based on the received graphics-oriented instructions. Graphics unit 975 may generally be configured to process large blocks of data in parallel and may build images in a frame buffer for output to a display, which may be included in the device or may be a separate device. Graphics unit 975 may include transform, lighting, triangle, and rendering engines in one or more graphics processing pipelines. Graphics unit 975 may output pixel information for display images. Graphics unit 975, in various embodiments, may include programmable shader circuitry which may include highly parallel execution cores configured to execute graphics programs, which may include pixel tasks, vertex tasks, and compute tasks (which may or may not be graphics-related).

Display unit 965 may be configured to read data from a frame buffer and provide a stream of pixel values for display. Display unit 965 may be configured as a display pipeline in some embodiments. Additionally, display unit 965 may be configured to blend multiple frames to produce an output frame. Further, display unit 965 may include one or more interfaces (e.g., MIPI® or embedded display port (eDP)) for coupling to a user display (e.g., a touchscreen or an external display).

I/O bridge 950 may include various elements configured to implement: universal serial bus (USB) communications, security, audio, and low-power always-on functionality, for example. I/O bridge 950 may also include interfaces such as pulse-width modulation (PWM), general-purpose input/output (GPIO), serial peripheral interface (SPI), and inter-integrated circuit (I2C), for example. Various types of peripherals and devices may be coupled to device 900 via I/O bridge 950.

In some embodiments, device 900 includes network interface circuitry (not explicitly shown), which may be connected to fabric 910 or I/O bridge 950. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 900 with connectivity to various types of other devices and networks.

Example Applications

Figure 10:
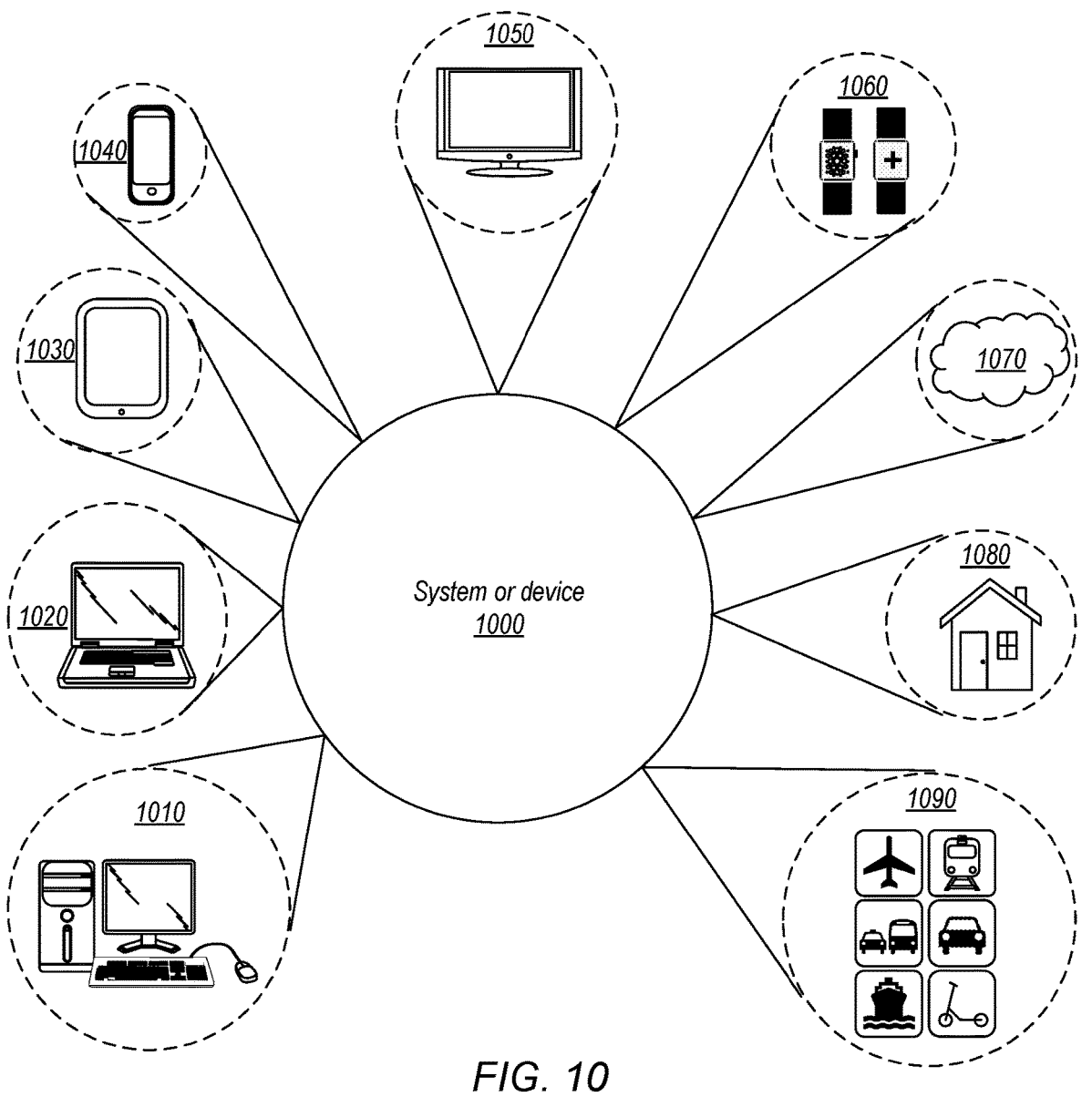
FIG. 10 is a diagram illustrating example applications of disclosed systems and devices, according to some embodiments.

Turning now to FIG. 10, various types of systems that may include any of the circuits, devices, or system discussed above. System or device 1000, which may incorporate or otherwise utilize one or more of the techniques described herein, may be utilized in a wide range of areas. For example, system or device 1000 may be utilized as part of the hardware of systems such as a desktop computer 1010, laptop computer 1020, tablet computer 1030, cellular or mobile phone 1040, or television 1050 (or set-top box coupled to a television).

Similarly, disclosed elements may be utilized in a wearable device 1060, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1000 may also be used in various other contexts. For example, system or device 1000 may be utilized in the context of a server computer system, such as a dedicated server or on shared hardware that implements a cloud-based service 1070. Still further, system or device 1000 may be implemented in a wide range of specialized everyday devices, including devices 1080 commonly found in the home such as refrigerators, thermostats, security cameras, etc. The interconnection of such devices is often referred to as the "Internet of Things" (IoT). Elements may also be implemented in various modes of transportation. For example, system or device 1000 could be employed in the control systems, guidance systems, entertainment systems, etc. of various types of vehicles 1090.

The applications illustrated in FIG. 10 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 11:
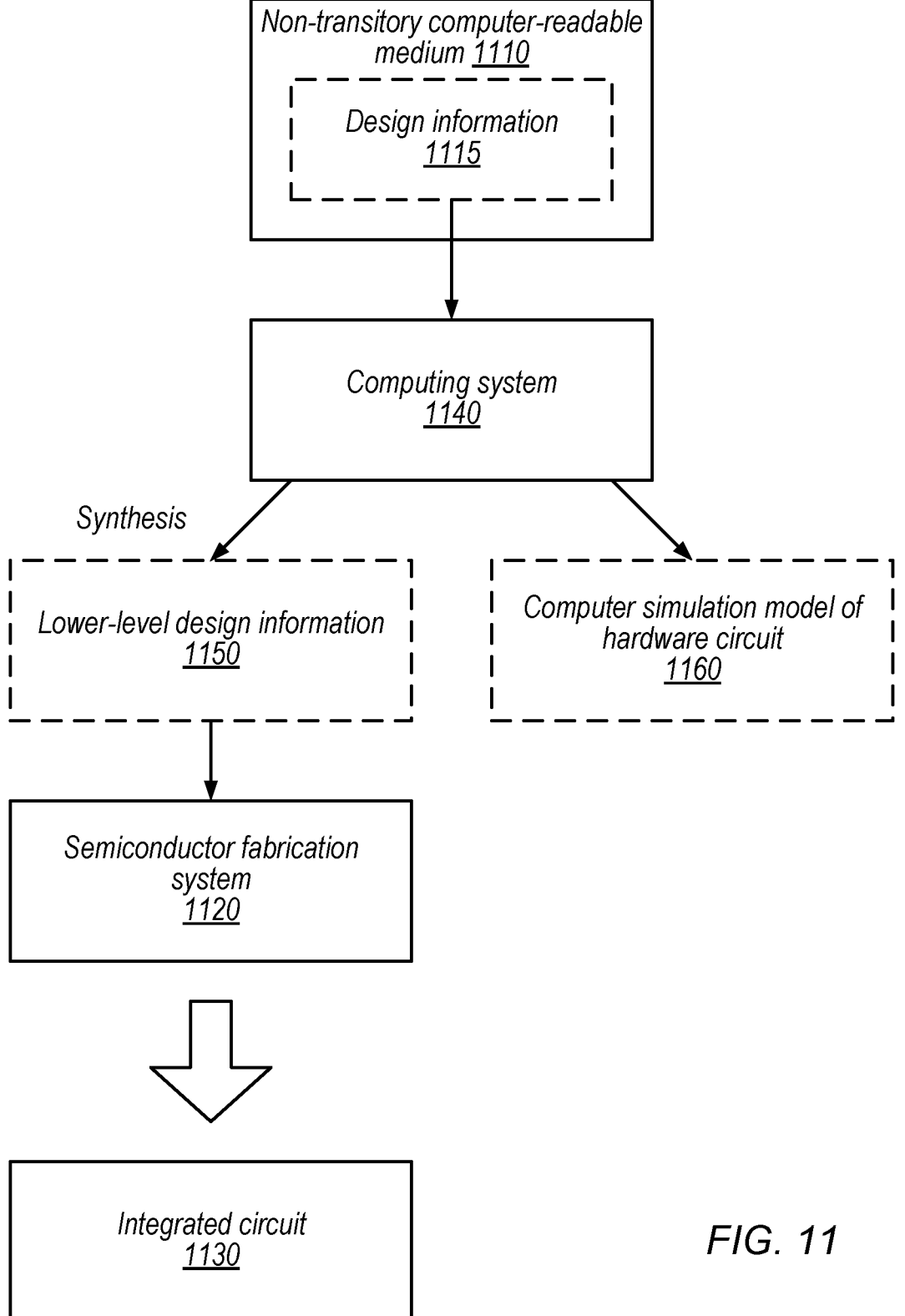
FIG. 11 is a block diagram illustrating an example computer-readable medium that stores circuit design information, according to some embodiments.

FIG. 11 is a block diagram illustrating an example non-transitory computer-readable storage medium that stores circuit design information, according to some embodiments. In the illustrated embodiment, computing system 1140 is configured to process the design information. This may include executing instructions included in the design information, interpreting instructions included in the design information, compiling, transforming, or otherwise updating the design information, etc. Therefore, the design information controls computing system 1140 (e.g., by programming computing system 1140) to perform various operations discussed below, in some embodiments.

In the illustrated example, computing system 1140 processes the design information to generate both a computer simulation model of a hardware circuit 1160 and lower-level design information 1150. In other embodiments, computing system 1140 may generate only one of these outputs, may generate other outputs based on the design information, or both. Regarding the computing simulation, computing system 1140 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 1140 also processes the design information to generate lower-level design information 1150 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 1150 (potentially among other inputs), semiconductor fabrication system 1120 is configured to fabricate an integrated circuit 1130 (which may correspond to functionality of the simulation model 1160). Note that computing system 1140 may generate different simulation models based on design information at various levels of description, including information 1150, 1115, and so on. The data representing design information 1150 and model 1160 may be stored on medium 1110 or on one or more other media.

In some embodiments, the lower-level design information 1150 controls (e.g., programs) the semiconductor fabrication system 1120 to fabricate the integrated circuit 1130. Thus, when processed by the fabrication system, the design information may program the fabrication system to fabricate a circuit that includes various circuitry disclosed herein.

Non-transitory computer-readable storage medium 1110, may comprise any of various appropriate types of memory devices or storage devices. Non-transitory computer-readable storage medium 1110 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1110 may include other types of non-transitory memory as well or combinations thereof. Accordingly, non-transitory computer-readable storage medium 1110 may include two or more memory media; such media may reside in different locations—for example, in different computer systems that are connected over a network. Non-transitory computer-readable storage medium 1110 may store design information 1115 representative of the SOC 30.

Design information 1115 may be specified using any of various appropriate computer languages, including hardware description languages such as, without limitation: VHDL, Verilog, SystemC, SystemVerilog, RHDL, M, MyHDL, etc. The format of various design information may be recognized by one or more applications executed by computing system 1140, semiconductor fabrication system 1120, or both. In some embodiments, design information may also include one or more cell libraries that specify the synthesis, layout, or both of integrated circuit 1130. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry (e.g., SOC 30).

Integrated circuit 1130 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 1120 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1120 may also be configured to perform various testing of fabricated circuits for correct operation.

In various embodiments, integrated circuit 1130 and model 1160 are configured to operate according to a circuit design specified by design information 1115, which may include performing any of the functionality described herein. For example, integrated circuit 1130 may include any of various elements shown in FIGS. 1-5. Further, integrated circuit 1130 may be configured to perform various functions described herein in conjunction with other components.

Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 1120 to fabricate integrated circuit 1130.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit.

For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A system comprising:
one or more source circuits configured to initiate memory transactions, where a given memory transaction includes a memory address within a memory address space corresponding to a memory system;
a cryptographic key source circuit configured to generate one or more cryptographic keys during a system boot;
one or more encryption circuits, wherein a given encryption circuit is configured to receive the memory address and to encrypt, based on a particular cryptographic key of the one or more cryptographic keys, a portion of the memory address to form an encrypted memory address;
one or more memory circuits, wherein a given memory circuit is configured to access a row of a plurality of rows in the given memory circuit for data corresponding to the given memory transaction using the encrypted memory address without first decrypting the encrypted memory address; and
wherein the given encryption circuit is further configured to:
at a point in time after the particular cryptographic key has been used, modify mapping of received memory addresses to encrypted memory addresses based on a new cryptographic key, different from the particular cryptographic key.

2. The system of claim 1, wherein the given encryption circuit is incorporated into a given source circuit that initiates the given memory transaction.

3. The system of claim 1, wherein the given encryption circuit is incorporated into the given memory circuit.

4. The system of claim 1, wherein the given memory circuit comprises a plurality of banks, and wherein the plurality of rows are included in a given bank of the plurality of banks and the given bank is selected based on at least a portion of the encrypted memory address.

5. The system of claim 4, wherein the given memory circuit is coupled to a given channel of a plurality of channels, and the given channel is selected based on yet another portion of the encrypted memory address; and
wherein the given memory circuit is a given rank of a plurality of ranks on the given channel, and the given rank is selected based on still another portion of the encrypted memory address.

6. The system of claim 1, wherein the given encryption circuit is configured to encrypt data being written to the given memory circuit based on the given memory transaction being a write transaction.

7. The system of claim 1, wherein the given encryption circuit is configured to decrypt data being read from the given memory circuit based on the given memory transaction being a read transaction.

8. The system of claim 7, wherein to decrypt the data being read from the given memory circuit, the given encryption circuit is configured to use a different cryptographic key from the particular cryptographic key.

9. The system of claim 1, wherein the cryptographic key source circuit is configured to randomize the one or more cryptographic keys at an initialization of the system.

10. A method comprising:
generating, by a computer system, one or more cryptographic keys during boot of the computer system;
encrypting, by the computer system using a particular cryptographic key of the one or more cryptographic keys, a memory address of a memory transaction to form an encrypted memory address;
selecting, by the computer system, a row of a memory device to access for the memory transaction using at least a portion of the encrypted memory address, wherein the selecting is performed without first decrypting the encrypted memory address; and
at a point in time after the particular cryptographic key has been used, remapping, by the computer system based on a different cryptographic key, memory addresses of memory transactions to encrypted memory addresses.

11. The method of claim 10, wherein:
the generating of the one or more cryptographic keys is performed by a cryptographic key source circuit of the computer system; and
the method further comprises randomizing, by the cryptographic key source circuit, the one or more cryptographic keys during the boot of the system.

12. The method of claim 10, wherein the encrypting is performed by an encryption circuit of the computer system.

13. The method of claim 12, further comprising:
encrypting, by the encryption circuit based on the memory transaction being a write transaction, data being written to the memory device, wherein the encrypting is performed in a manner dependent on content of the data being encrypted and cryptographic keys used for encrypting the data.

14. The method of claim 12, further comprising:
decrypting, by the encryption circuit based on the memory transaction being a read transaction, data being read from the memory device, wherein the decrypting is performed using one or more cryptographic keys.

15. A system, comprising:
one or more source circuits configured to initiate memory transactions, where a given memory transaction includes a memory address within a memory address space corresponding to a memory system;
a secret datum source circuit configured to generate a particular secret datum based on a system initialization;
one or more secure hash circuits, wherein a given secure hash circuit is configured to:
receive the memory address; and
hash the memory address with the particular secret datum to form an output memory address; and
one or more memory circuits, wherein a given memory circuit is configured to access a row of a plurality of rows in the given memory circuit for data corresponding to the given memory transaction using the output memory address; and wherein, the one or more secure hash circuits are configured to:

at a point in time after the particular secret datum has been used, hash the memory address with a different secret datum to form a different output memory address.

16. The system of claim 15, wherein the given secure hash circuit is incorporated into a given source circuit that initiates the given memory transaction.

17. The system of claim 15, wherein the given memory circuit comprises a plurality of banks, and wherein the plurality of rows are included in a given bank of the plurality of banks that is selected based on at least another portion of the output memory address.

18. The system of claim 17, wherein the given memory circuit is coupled to a given channel of a plurality of channels, and the given channel is selected based on yet another portion of the output memory address; and wherein the given memory circuit is a given rank of a plurality of ranks on the given channel, and the given rank is selected based on still another portion of the output memory address.

19. The system of claim 15, wherein the given secure hash circuit is further configured to encrypt, based on the particular secret datum, data being written to the given memory circuit.

20. The system of claim 15, wherein the secret datum source circuit is configured to randomize the particular secret datum at an initialization of the system.

\* \* \* \* \*